United States Patent
Baughman et al.

(10) Patent No.: US 10,678,752 B2
(45) Date of Patent: Jun. 9, 2020

(54) CLOSURE-BASED CONTAINER VOLUMES WITH RATIO-BASED MODELING

(71) Applicant: International Business Machines Corporation, Armonk, NY (US)

(72) Inventors: Aaron K. Baughman, Silver Spring, MD (US); Gary Diamanti, Wake Forest, NC (US); Mauro Marzorati, Lutz, FL (US); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 304 days.

(21) Appl. No.: 15/890,755

(22) Filed: Feb. 7, 2018

(65) Prior Publication Data

US 2019/0243907 A1    Aug. 8, 2019

(51) Int. Cl.
*G06F 16/14* (2019.01)
*G06F 16/13* (2019.01)
*G06F 16/182* (2019.01)

(52) U.S. Cl.
CPC ............ *G06F 16/148* (2019.01); *G06F 16/13* (2019.01); *G06F 16/182* (2019.01)

(58) Field of Classification Search
CPC ....... G06F 16/148; G06F 16/182; G06F 16/13
USPC ................................. 707/705, 736, 755, 758
See application file for complete search history.

(56) References Cited

U.S. PATENT DOCUMENTS

| | | | |
|---|---|---|---|
| 5,578,494 A | 11/1996 | Clark et al. | |
| 7,409,494 B2 * | 8/2008 | Edwards | G06F 3/0619 707/114 |
| 7,949,865 B1 | 5/2011 | Yadav | |
| 8,175,617 B2 | 5/2012 | Rhoads et al. | |
| 8,843,459 B1 * | 9/2014 | Aston | G06F 3/0608 707/694 |
| 10,146,694 B1 * | 12/2018 | Laier | G06F 12/0893 |
| 2005/0192932 A1 | 9/2005 | Kazar et al. | |
| 2010/0191624 A1 * | 7/2010 | Sharir | G06Q 30/02 705/30 |
| 2010/0228799 A1 * | 9/2010 | Hutton | G06F 3/0607 707/822 |
| 2012/0303929 A1 * | 11/2012 | Chiu | G06F 16/13 711/173 |
| 2015/0293933 A1 | 10/2015 | Osmond | |

(Continued)

OTHER PUBLICATIONS

Wang et al., "Distributed Edge Caching Scheme Considering the Tradeoff Between the Diversity and Redundancy of Cached Content", 2015 International Conference on Communications in China (ICCC), Nov. 2015, 6 apges.

(Continued)

*Primary Examiner* — Hares Jami
(74) *Attorney, Agent, or Firm* — Yee & Associates, P.C.

(57) ABSTRACT

Accessing files within user inaccessible lower layer data volumes on a multilayered data volume container is provided. A single dimension variable corresponding to a file request is generated. A file prediction distribution over files in closed lower volumes on the container is calculated by inputting the single dimension variable into a probability density function. A volume closure file recommendation corresponding to a file in a closed lower volume is generated based on the file prediction distribution. The file in the closed lower volume is retrieved.

25 Claims, 9 Drawing Sheets

(56) References Cited

U.S. PATENT DOCUMENTS

2017/0124345 A1    5/2017  Christiansen et al.
2017/0185511 A1*   6/2017  Chiu ..................... G06F 3/0604
2018/0307537 A1*  10/2018  Chen ................... G06F 9/45504

OTHER PUBLICATIONS

Lange et al., "The grapho-phonological system of written French: Statistical analysis and empirical validation", ACL 99 Proceedings of the 37th Annual Meeting of the Association for Computational Linguistics, Jun. 1999, pp. 436-442.
Li et al., "Agent-based container terminal optimization", Proceedings of the 10th International Conference on Autonomous Agents and Multiagent Systems (AAMAS'11), May 2011, pp. 1113-1114.
"IEEE Standard for Hazardous Material Incident Management Message Sets for Use by Emergency Management Centers", IEEE, Jul. 7, 2006, 2 pages. Abstract Only. http://ieeexplore.ieee.org/servlet/opac?punumber=11015.
Mell et al., "The NIST Definition of Cloud Computing", Computer Security Division, National Institute of Standards and Technology, Jan. 2011, 7 pages.

\* cited by examiner

CLOSURE-BASED CONTAINER VOLUMES WITH RATIO-BASED MODELING

BACKGROUND

1. Field

The disclosure relates generally to data containers and more specifically to managing access to files within user inaccessible lower layer data volumes on a multilayered data volume container based on user context and file similarity measures corresponding to requests to access the files in the container.

2. Description of the Related Art

In computing, a file system controls how data is stored and retrieved. Without a file system, information placed in a data storage medium would be one large body of data with no way to tell where one piece of information stops and the next begins. By separating the data into groups and giving each group a name, the file system is able to identify and retrieve requested information. Each group of data is called a "file".

File system images are a series of read-only layers that comprise a file system. A container is an instantiation of those read-only layers with a single read-write layer on top. Any file changes made within a container are reflected as a copy of modified data from the read-only layer. The version in the top read-write layer hides the underlying file in a lower layer, but does not remove it.

A container image is a lightweight, stand-alone, executable package of a piece of software that includes everything, such as code, runtime, system tools, system libraries, and settings, needed to run a container. Container images are constructed from file system layers and share common files. Containerized software will always run the same, regardless of its environment. Containers running on a single machine, such as a server computer, share that machine's operating system kernel. Containers isolate programs and applications from one another and from the underlying infrastructure for security.

Containers and virtual machines have similar resource isolation and allocation benefits, but function differently because containers virtualize the operating system instead of hardware. Multiple containers can run on the same machine and share the operating system kernel with other containers, each running as isolated processes in the user space. Containers take up less space than virtual machines and can start almost instantly.

Containerization, also known as operating-system-level virtualization, refers to an operating system feature in which the operating system kernel allows the existence of multiple isolated user space instances. Such user space instances, called containers may look like real computers from the point of view of applications or programs running in the containers. In other words, applications or programs running inside a container can only see the container's contents and devices assigned to that particular container.

Several containers can be created on one operating system, each container being allocated a subset of the computer's resources. Each container may contain any number of software applications. Operating-system-level virtualization is commonly used in virtual hosting environments, where it is useful for securely allocating a finite number of hardware resources among a large number of users.

A data volume is a specially-designated directory inside a container that exists to hold persistent or commonly shared data in an organized way. Data volumes provide several useful features for persistent or shared data. For example, volumes are initialized and assigned when a container is created. If the container's base image contains data at a specified mount point, that existing data is copied into the new volume upon volume initialization. Data volumes can be shared and reused among containers. Changes to a data volume are made directly.

Data containers created by software-defined infrastructure have accelerated application development and architecture. Software-defined infrastructure is a computing infrastructure entirely under the control of software with no operator or human intervention. This convenience has grown into DevOps where multiple disciplines work together to ensure seamless cloud resource availability. When a data container is created, layers are placed on top of one another. Each layer defines a set of changes to be delivered to the final container image. The sharing of data between containers is done through volumes. When a volume is mounted to a specific layer, the volume hides all other underlying files in lower layers. In other words, the underlying files in lower layers are no longer accessible by a user. This problem is compounded when multiple volumes are mounted on top of each other. As files stored in one region are synced over to files stored in another region, the hidden files are not transferred. No solutions currently exist that take into account this problem of files within lower layers of a multilayered container not being accessible.

SUMMARY

According to one illustrative embodiment, a computer-implemented method for accessing files within user inaccessible lower layer data volumes on a multilayered data volume container is provided. A computer generates a single dimension variable corresponding to a file request. The computer calculates a file prediction distribution over files in closed lower volumes on the multilayered data volume container by inputting the single dimension variable into a probability density function. The computer generates a volume closure file recommendation corresponding to a file in a closed lower volume based on the file prediction distribution. The computer retrieves the file in the closed lower volume that corresponds to the volume closure file recommendation. According to other illustrative embodiments, a computer system and computer program product for accessing files within user inaccessible lower layer data volumes on a multilayered data volume container are provided.

According to yet another illustrative embodiment, a computer-implemented method for managing access to files within a multilayered data volume container is provided. A computer receives, from a client device via a network, a request to access a requested file having a particular file characteristic within a data container of the computer that includes layered volumes arranged such that files in lower volumes beneath a top volume are inaccessible to a user of the client device. The computer determines that the top volume does not contain a matching file having the particular file characteristic corresponding to the requested file. The computer identifies a file in the lower volumes that substantially matches the requested file having the particular file characteristic based on a generated similarity measure. The computer syncs to the file in the lower volumes such that the file is accessible in the top volume. According to yet another illustrative embodiment, a computer program product for managing access to files within a multilayered data volume container is provided.

Thus, instead of losing access to data in volumes within lower layers of a multilayered data volume container when a volume is mounted on a top layer of the container, illustrative embodiments utilize closure-based volumes to expose the data within the lower layers of the container. Illustrative embodiments disambiguate file access and provide precise data content consumption by utilizing a probability density function to model user context and data content corresponding to the file request to recommend files in inaccessible or closed lower layers of the container. As a result, illustrative embodiments enable users to access files within inaccessible lower layer volumes of a multilayered data volume container.

In addition, illustrative embodiments provide a technical solution to accessing hidden files within lower level volumes of a data container by utilizing streaming analytics technology. Further, illustrative embodiments model user context to provide personalized data file access recommendations. Consequently, illustrative embodiments provide an ability to vary user data consumption based on predictive user modeling, which illustrative embodiments stream from user attributes, over a period of time.

DETAILED DESCRIPTION

Figure 1:
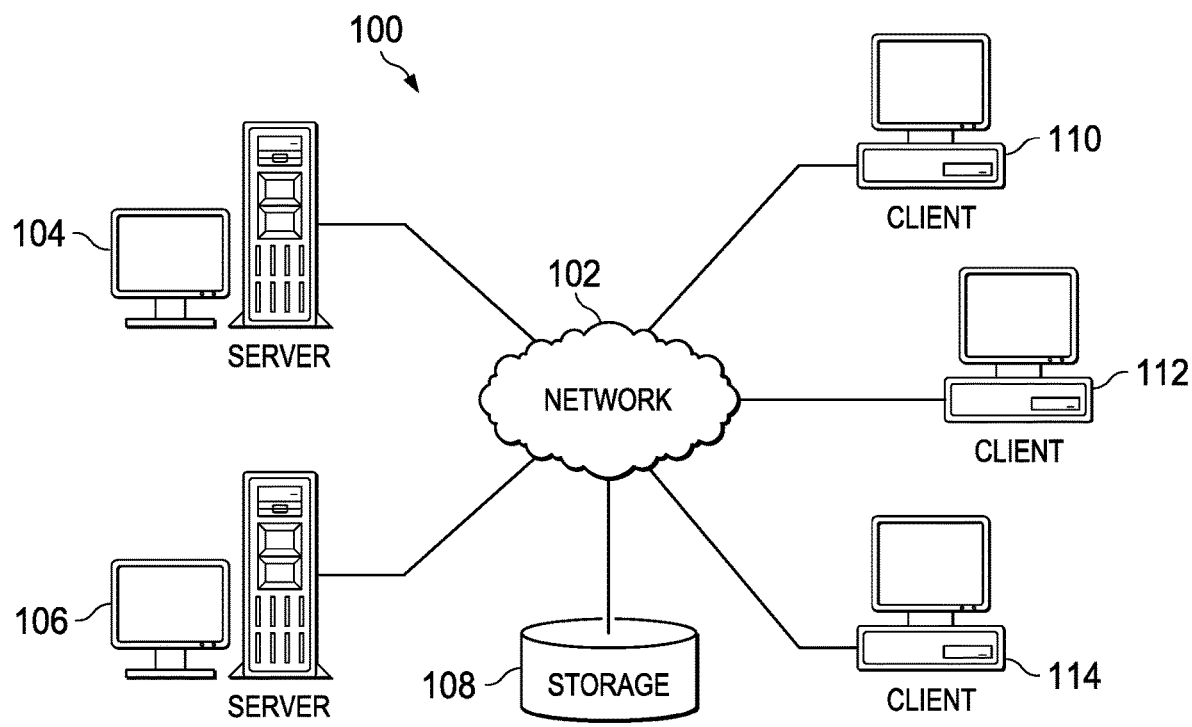
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-6, diagrams of data processing environments are provided in which illustrative embodiments may be implemented. It should be appreciated that FIGS. 1-6 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide services for managing access to files within inaccessible lower-layered data volumes (i.e., closed user access volumes) on multilayered data volume containers based on user context and file similarity measures corresponding to requests by client device users to access files having particular characteristics, such as particular file names. Also, it should be noted that server 104 and server 106 may represent a cluster of servers in a data center hosting one or more volume closure file management services. Alternatively, server 104 and server 106 may represent a group of servers in a cloud environment that provides these volume closure file management services.

Client 110, client 112, and client 114 also connect to network 102. Clients 110, 112, and 114 are clients of server 104 and server 106. In this example, clients 110, 112, and 114 are illustrated as desktop or personal computers with wire communication links to network 102. However, it should be noted that clients 110, 112, and 114 are meant as examples only. In other words, clients 110, 112, and 114 may include other types of data processing systems, such as, for example, network computers, laptop computers, handheld computers, smart phones, smart televisions, smart watches, smart appliances, smart vehicles, gaming devices, kiosks, and the like, with wire or wireless communication links to network 102. Users of clients 110, 112, and 114 may utilize clients 110, 112, and 114 to transmit file access requests to server 104 and server 106 providing the volume closure file management services. In addition, server 104 and server 106 also may provide information, such as software applications and programs to clients 110, 112, and 114.

Storage 108 is a network storage device capable of storing any type of data in a structured format or an unstructured format. In addition, storage 108 may represent a plurality of network storage devices. Further, storage 108 may store identifiers for a plurality of client device users, profiles for the plurality of client device users, file access trends by the plurality of client device users, activities performed by the plurality of client device users after accessing files, and the like. Furthermore, storage unit 108 may store other types of data, such as authentication or credential data that may include user names, passwords, and biometric data associated with the plurality of client device users and system administrators, for example.

In addition, it should be noted that network data processing system 100 may include any number of additional server computers, client devices, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), and a wide area network (WAN). FIG. 1 is intended as an example only, and not as an architectural limitation for the different illustrative embodiments.

Figure 2:
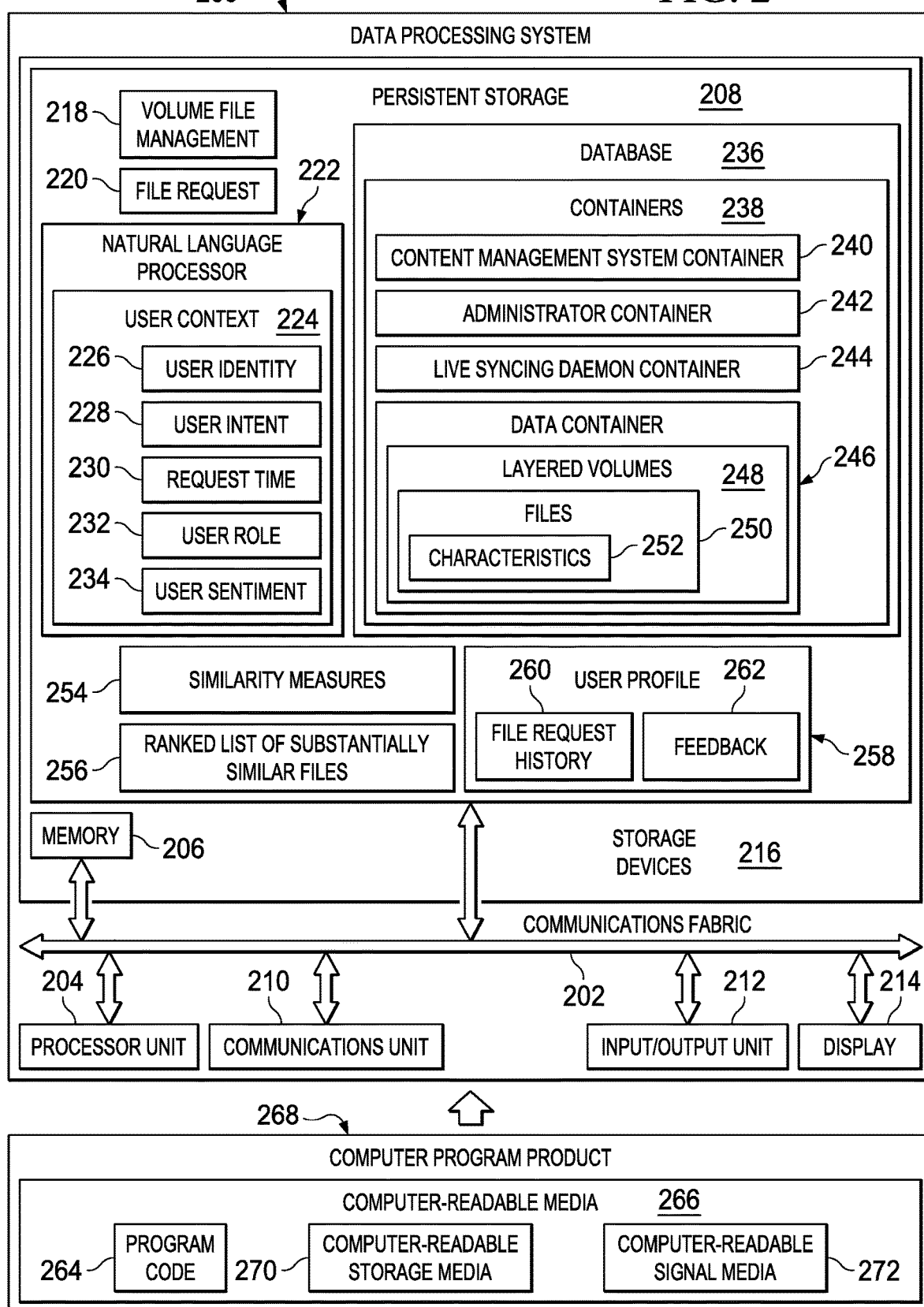
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores volume file manager 218. However, it should be noted that even though volume file manager 218 is illustrated as residing in persistent storage 208, in an alternative illustrative embodiment volume file manager 218 may be a separate component of data processing system 200. For example, volume file manager 218 may be a hardware component coupled to communication fabric 202 or a combination of hardware and software components. In another alternative illustrative embodiment, a first portion volume file manager 218 may be located on data processing system 200 and a second portion of volume file manager 218 may be located on a second data processing system, such as server 106 or client 110 in FIG. 1. In yet another alternative illustrative embodiment, volume file manager 218 may be located on client devices in addition to, or instead of, data processing system 200.

Volume file manager 218 controls access to a set of one or more files within user inaccessible or closed lower layer data volumes of a multilayered data volume container in response to receiving a request to access a file having a particular file name or characteristic. Volume file manager 218 receives file request 220, which represents the request to access the file having the particular file name. Volume file manager 218 utilizes natural language processor 222 to analyze file request 220 to determine user context 224 of file request 220.

In this example, user context 224 includes user identity 226, user intent 228, request time 230, user role 232, and user sentiment 234. User identity 226 represents a unique identifier corresponding a user of a client device that sent file request 220 to data processing system 200. User intent 228 represents an activity or action, such as read or write, that the user wants to perform on the file corresponding to file request 220. Request time 230 represents a time of day when data processing system 200 received file request 220 from the client device. User role 232 represents a role, persona, or personality of the client device user when sending file request 220. For example, user role 232 of the client device user may be a job-related role when sending file request 220 at 9:00 a.m. Monday while at work. Alternatively, user role 232 of the client device user may be an entertainment-related role when sending file request 220 at 7:00 p.m. Saturday while driving a vehicle. User sentiment 234 represents a sentiment and/or tone expressed by the client device user in file request 220. The sentiment or tone may be satisfied or angry, for example.

Database 236 represents a data structure for storing and retrieving data. Database 236 includes containers 238. Containers 238 represent a plurality of data containers within database 236.

In this example, containers 238 include content management system container 240, administrator container 242, live syncing daemon container 244, and data container 246. Content management system container 240 enables creation and modification of data content by multiple users in database 236. Administrator container 242 updates database 236. Live syncing daemon 244 synchronizes data changes to volumes corresponding to different geographic regions.

Data container 246 represents a multilayered data volume container, which includes a plurality of layered volumes 248. It should be noted that data container 246 may represent a set of one or more data containers within database 236. Content management system container 240 manages the set of data containers.

Layered volumes 248 include a top layer volume, which is accessible by client device users submitting file access requests. Layered volumes 248 also include a set of one or more lower layer volumes, which is inaccessible by client device users. Each volume in layered volumes 248 includes a set of files, such as files 250. Files 250 may represent any type and number of data files that client device users may want or need to access. Files 250 include characteristics 252. Characteristics 252 identify files 250. A file characteristic may be, for example, a file name that corresponds to a particular file in files 250.

Volume file manager 218 generates similarity measures 254, which correspond to file request 220. Similarity measures 254 represent how closely files within layered volumes 248 match file request 220. If volume file manager 218 does not find an exact match for file request 220 in the top layer volume, then volume file manager 218 determines a set of one or more substantially similar files within lower layer volumes based on generated similarity measures 254. Volume file manager 218 places the set of substantially similar files in ranked list of substantially similar files 256. Volume file manager 218 ranks the files in ranked list of substantially similar files 256 based on information in user context 224. Volume file manager 218 selects and sends the highest-ranking file in ranked list of substantially similar files 256 to the client device user that sent file request 220.

Volume file manager 218 also may maintain user profile 258 for each client device user who makes a file access request. In this example, user profile 258 includes file request history 260, which may include some or all of the information contained in user context 224. In addition, user profile includes feedback 262. Feedback 262 represents client device user feedback regarding a received file in response to a particular file request.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information, such as a locally deployed microservice under development in a software development kit, to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 264 is located in a functional form on computer readable media 266 that is selectively removable and may be loaded onto or transferred to data processing system 200 for running by processor unit 204. Program code 264 and computer readable media 266 form computer program product 268. In one example, computer readable media 266 may be computer readable storage media 270 or computer readable signal media 272. Computer readable storage media 270 may include, for example, an optical or magnetic disc that is inserted or placed into a drive or other device that is part of persistent storage 208 for transfer onto a storage device, such as a hard drive, that is part of persistent storage 208. Computer readable storage media 270 also may take the form of a persistent storage, such as a hard drive, a thumb drive, or a flash memory that is connected to data processing system 200. In some instances, computer readable storage media 270 may not be removable from data processing system 200.

Alternatively, program code 264 may be transferred to data processing system 200 using computer readable signal media 272. Computer readable signal media 272 may be, for example, a propagated data signal containing program code 264. For example, computer readable signal media 272 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 264 may be downloaded over a network to persistent storage 208 from another device or data processing system through computer readable signal media 272 for use within data processing system 200. For instance, program code stored in a computer readable storage media in a data processing system may be downloaded over a network from the data processing system to data processing system 200. The data processing system providing program code 264 may be a server computer, a client computer, or some other device capable of storing and transmitting program code 264.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 270 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

It is understood that although this disclosure includes a detailed description on cloud computing, implementation of the teachings recited herein are not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the service's provider. Broad network access provides for capabilities that are available over a network and accessed through standard mechanisms that promote use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

Figure 3:
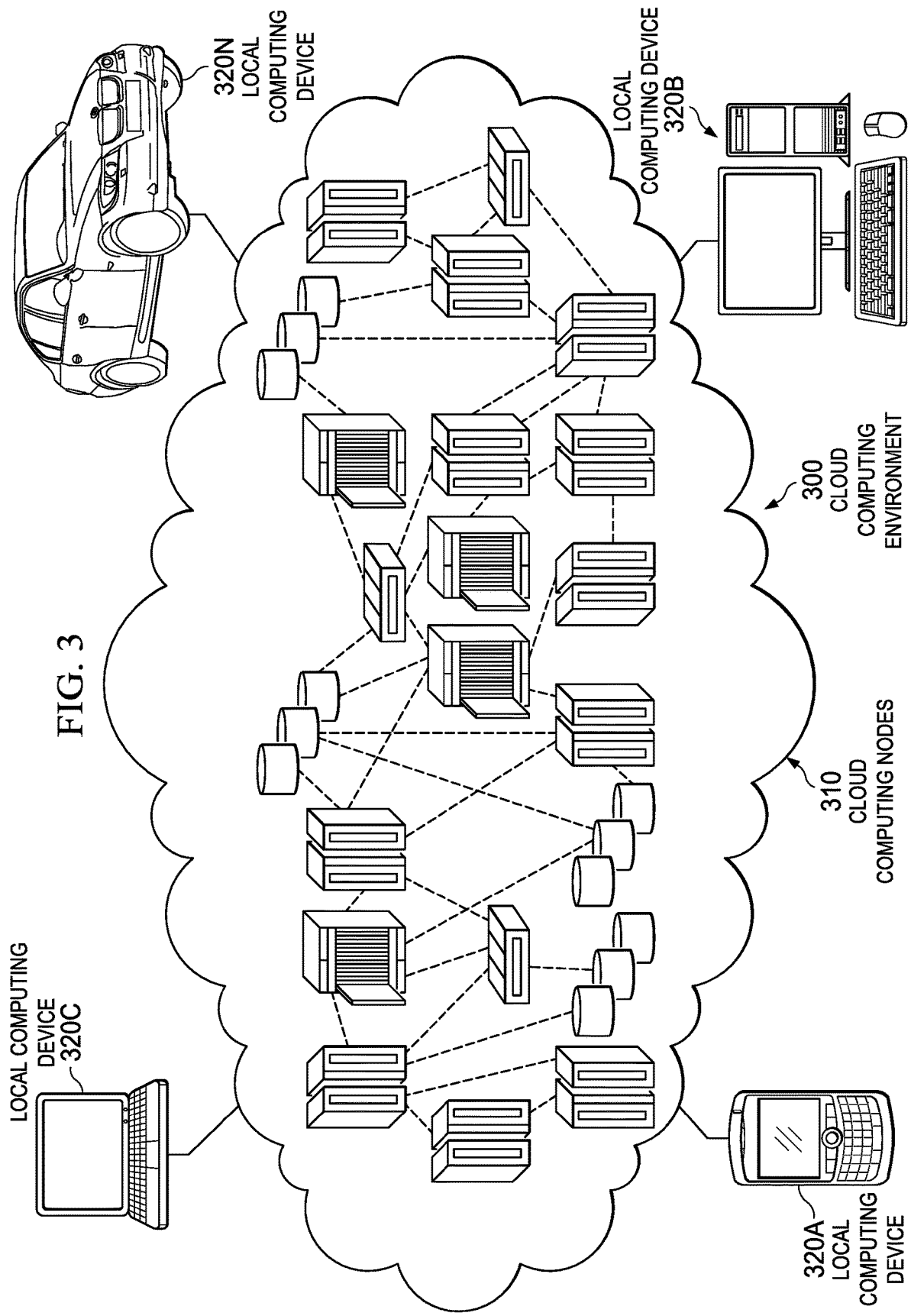
FIG. 3 is a diagram illustrating a cloud computing environment in which illustrative embodiments may be implemented.

With reference now to FIG. 3, a diagram illustrating a cloud computing environment is depicted in which illustrative embodiments may be implemented. In this illustrative example, cloud computing environment 300 includes a set of one or more cloud computing nodes 310 with which local computing devices used by cloud consumers, such as, for example, personal digital assistant or a smart phone 320A, desktop computer 320B, laptop computer 320C, and/or automobile computer system 320N, may communicate. Cloud computing nodes 310 may be, for example, server 104 and server 106 in FIG. 1. Local computing devices 320A-320N may be, for example, clients 110-114 in FIG. 1.

Cloud computing nodes 310 may communicate with one another and may be grouped physically or virtually into one or more networks, such as private, community, public, or hybrid clouds as described hereinabove, or a combination thereof. This allows cloud computing environment 300 to offer infrastructure, platforms, and/or software as services for which a cloud consumer does not need to maintain resources on a local computing device, such as local computing devices 320A-320N. It is understood that the types of local computing devices 320A-320N are intended to be illustrative only and that cloud computing nodes 310 and cloud computing environment 300 can communicate with any type of computerized device over any type of network and/or network addressable connection using a web browser, for example.

Figure 4:
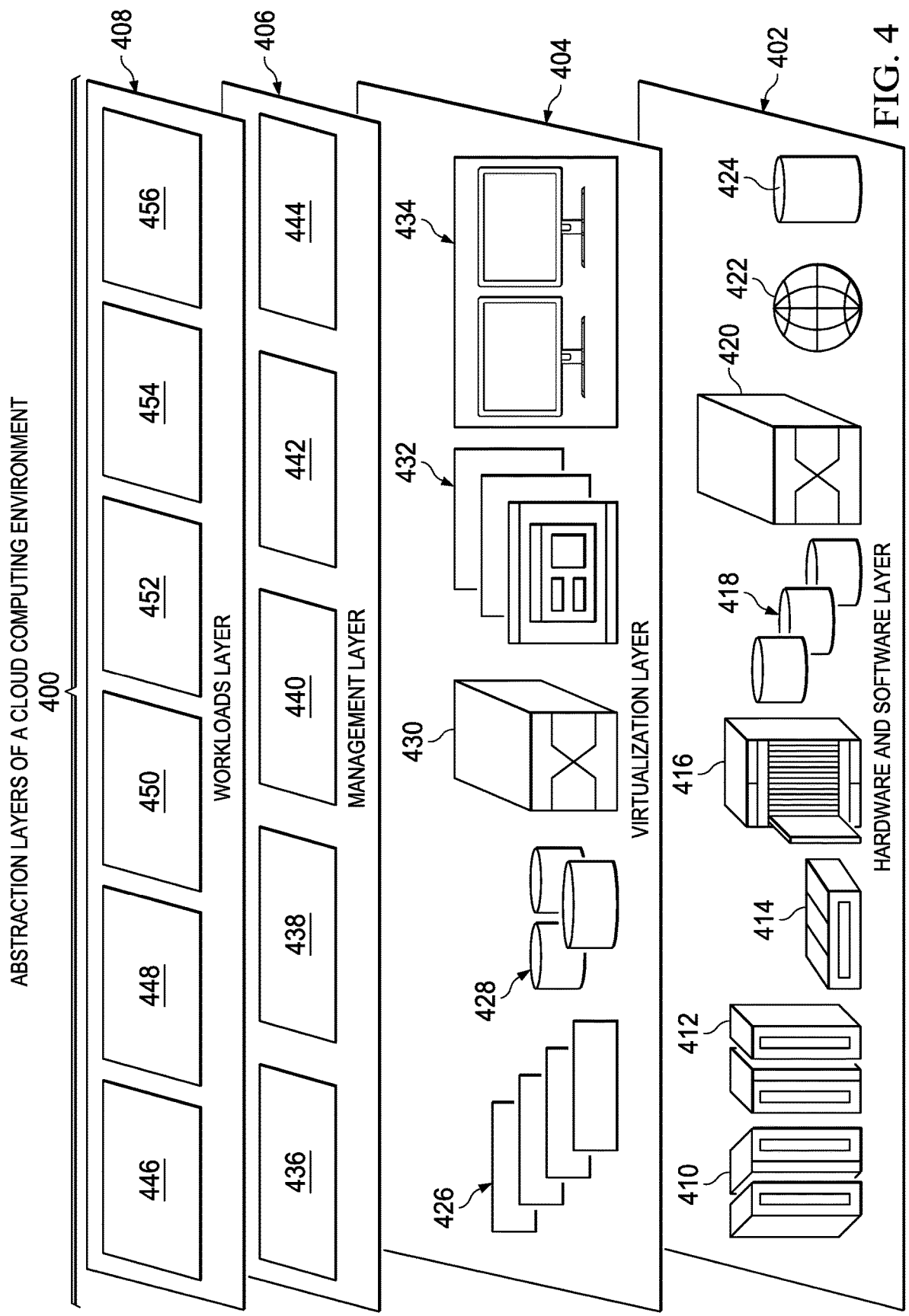
FIG. 4 is a diagram illustrating an example of abstraction layers of a cloud computing environment in accordance with an illustrative embodiment.

With reference now to FIG. 4, a diagram illustrating abstraction model layers is depicted in accordance with an illustrative embodiment. The set of functional abstraction layers shown in this illustrative example may be provided by a cloud computing environment, such as cloud computing environment 300 in FIG. 3. It should be understood in advance that the components, layers, and functions shown in FIG. 4 are intended to be illustrative only and embodiments of the invention are not limited thereto. As depicted, the following layers and corresponding functions are provided.

Abstraction layers of a cloud computing environment 400 includes hardware and software layer 402, virtualization layer 404, management layer 406, and workloads layer 408. Hardware and software layer 402 includes the hardware and software components of the cloud computing environment. The hardware components may include, for example, mainframes 410, RISC (Reduced Instruction Set Computer) architecture-based servers 412, servers 414, blade servers 416, storage devices 418, and networks and networking components 420. In some illustrative embodiments, software components may include, for example, network application server software 422 and database software 424.

Virtualization layer 404 provides an abstraction layer from which the following examples of virtual entities may be provided: virtual servers 426; virtual storage 428; virtual networks 430, including virtual private networks; virtual applications and operating systems 432; and virtual clients 434.

In one example, management layer 406 may provide the functions described below. Resource provisioning 436 provides dynamic procurement of computing resources and other resources, which are utilized to perform tasks within the cloud computing environment. Metering and pricing 438 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 440 provides access to the cloud computing environment for consumers and system administrators. Service level management 442 provides cloud computing resource allocation and management such that required service levels are met. Service level agreement (SLA) planning and fulfillment 444 provides pre-arrangement for, and procurement of, cloud computing resources for which a future requirement is anticipated in accordance with an SLA.

Workloads layer 408 provides examples of functionality for which the cloud computing environment may be utilized. Example workloads and functions, which may be provided by workload layer 408, may include mapping and navigation 446, software development and lifecycle management 448, virtual classroom education delivery 450, data analytics processing 452, transaction processing 454, and volume file management 456.

The use of data containers and virtual servers is increasing. In addition, a lot of data is required to be shared between these data containers and virtual servers through data volumes. Instead of losing access to data in volumes within lower layers of a container when a volume is mounted in a top layer of the container, illustrative embodiments utilize closure-based volumes to expose the data within lower layers of a container. For example, to disambiguate file access (e.g., when files have the same name, but different data content) and to provide precise data content consumption by users, illustrative embodiments utilize a probability density function, such as a Cauchy Distribution, to model user context, such as user intent and sentiment, corresponding to a file access request and data content of the file to recommend and access data in hidden lower layer files. Thus, illustrative embodiments enable users to access hidden or closed files within lower layer volumes of a data container.

As a result, illustrative embodiments provide a technical solution to accessing hidden files within lower level volumes of a data container by utilizing streaming analytics technology in a cloud environment. Further, illustrative embodiments model user context to provide personalized data file access recommendations. Consequently, illustrative embodiments provide an ability to vary user data consumption based on predictive user modeling, which illustrative embodiments stream from user attributes, over a defined period of time.

Figure 5:
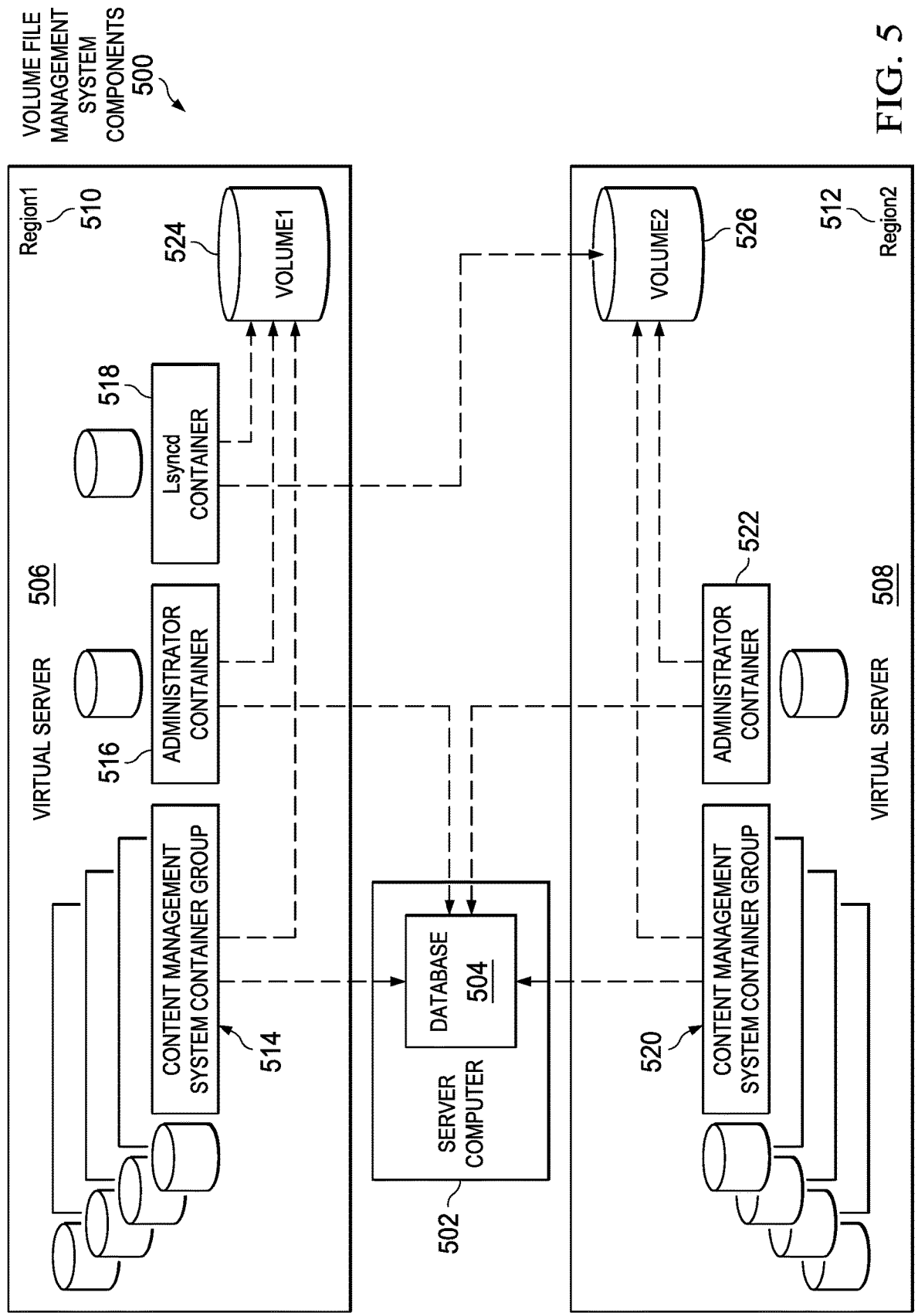
FIG. 5 is a diagram illustrating an example of volume file management system components in accordance with an illustrative embodiment.

With reference now to FIG. 5, a diagram illustrating an example of volume file management system components is depicted in accordance with an illustrative embodiment. Volume file management system components 500 represent a set of hardware and software components of a volume file management system. However, it should be noted that volume file management system components 500 are intended only as an example. In other words, alternative illustrative embodiments may include more or fewer components than illustrated. Volume file management system components 500 may be implemented in a network of data processing systems, such as network data processing system 100 in FIG. 1, a data processing system, such as data processing system 200 in FIG. 2, or in one or more cloud computing nodes, such as cloud computing nodes 310 in FIG. 3.

In this example, volume file management system components 500 include server computer 502. Server computer 502 contains database 504, such as, for example, database 236 in FIG. 2. Database 504 may represent any type of database, such as, for example, a relational database or an object-oriented database. In addition, database 504 may store any type of data.

In this example, server computer 502 includes virtual server 506 and virtual server 508. However, it should be noted that server computer 502 may include any number of virtual servers. Virtual server 506 manages data corresponding to Region1 510 within database 504. Region1 510 may correspond to New York, N.Y., for example. Virtual server 508 manages data corresponding to Region2 512 within database 504. Region2 512 may correspond to Dallas, Tex., for example.

Virtual server 506 contains content management system container group 514, administrator container 516, and live syncing daemon (lsyncd) container 518. Content management system container group 514 supports the creation and modification of data content by multiple users in a collaborative environment. Administrator container 516 provides updates to database 504. It should be noted that content management system container group 520 and administrator container 522 of virtual server 508 are similar in function to content management system container group 514 and administrator container 516 of virtual server 506.

Live syncing daemon container 518 monitors and aggregates any changes to data content within Volume1 524. Volume1 524 represents a region-specific volume of data corresponding to Region1 510. Volume1 524 contains a plurality of data files having particular file characteristics, such as particular file names. After each predefined period of time expires (e.g., after 3-5 seconds), live syncing daemon container 518 syncs the aggregated changes in the data content of Volume1 524 to the data content of Volume2 526. Volume2 526 represents a region-specific volume of data corresponding to Region2 512. In other words, live syncing daemon container 518 ensures that the data volumes in the different regions are synched every few seconds.

The example of FIG. 5 illustrates how server computer 502 generates a set of content management system containers. Without utilizing illustrative embodiments, the files on local hard disk drive of server computer 502 for each data container are masked or hidden after a mount. Server computer 502 utilizes illustrative embodiments to expose hidden files in lower layer volumes within multilayered data volume containers. The user may or may not specify in a request a volume name space to access a file. For example, if the user does not specify a volume name space, illustrative embodiments predict which file the user needs or wants based on user context and file similarity measures and provide the file to the user.

Server computer 502 generates secure socket layer (SSL) certificates to encrypt data sent to and from the content management system container groups, such as content management system container group 514 and content management system container group 520, so that the container groups can be accessed via hypertext transfer protocol secure (HTTPS). Server computer 502 also generates database 504. Server computer 502 further generates data volumes, such as Volume1 524 and Volume2 526.

Then, server computer 502 generates an administrator image. Server computer 502 generates administrator container 516 and administrator container 522 based on the administrator image. Server computer 502 binds internet protocol (IP) addresses to administrator container 516 and administrator container 522. Server computer 502 further generates a content management system image. Then, server computer 502 generates content management system container group 514 and content management system container group 520 based on the content management system image.

In addition, server computer 502 generates a live syncing daemon image. Then, server computer 502 generates live syncing daemon container 518 based on the live syncing daemon image. Server computer 502 further generates encryption keys for the live syncing daemon image using a secure shell (SSH) cryptographic network protocol for operating network services securely. Server computer 502 copies the generated encryption keys to administrator container 516 and administrator container 522. Server computer 502 establishes an SSH channel from live syncing daemon container 518 to administrator containers 516 and 522. Then, server computer 502 starts the live syncing daemon in live syncing daemon container 518 to synchronize the data content of Volume1 524 and Volume2 526.

Furthermore, server computer 502 utilizes a probability density function, such as a Cauchy Distribution, for each user and learns over time. A first multiple normal distributed variable may be based on natural language processing features extracted from file access requests, such as, for example, user sentiment, user tone, time of the requests, and the like. This enables server computer 502 to distinguish a user with multiple roles, personas, or personalities. For example, a user making a file access request at 10:00 a.m. during a work day (e.g., user requesting a file in a work-related role) as opposed to the user making a file access request at 10:00 p.m. on the weekend (e.g., user requesting a file in a leisure-related role). A second multiple normal distributed variable may be based on user intent, such as, for example, delete, read, write, put, and the like, corresponding to the file access requests. Server computer 502 reduces both of these multiple normal distributed variables to a single dimension variable so that a ratio of the two multiple normal distributed variables can be used in a Cauchy Distribution.

The Cauchy distribution has a probability density function:

$$f(x; x_0, \gamma) = \frac{1}{\pi\gamma \left[1 + \left(\frac{x - x_0}{\gamma}\right)^2\right]} = \frac{1}{\pi\gamma} \left[\frac{\gamma^2}{(x - x_0)^2 + \gamma^2}\right],$$

where $\chi_0$ is the location parameter that specifies the location of the peak distribution (i.e., the maximum peak location), $\gamma$ is the scale parameter that specifies the half-width at half-maximum, and $\chi$ is the ratio of the two multiple normal distributed variables. The probability density function specifies the probability of the ratio falling within a particular range of values as opposed to taking on any one value. The larger the scale parameter the more spread out the distribution.

However, it should be noted that alternative illustrative embodiments may utilize a block-chain ledger to track the status of each file in each of the data containers. A block-chain ledger is a continuously growing list of records, called blocks, which are linked and secured using cryptography. Each block typically contains a hash pointer as a link to a previous block, a timestamp, and transaction data. Once recorded, the data in any given block cannot be altered retroactively without the alteration of all subsequent blocks. This makes blockchains suitable for record management.

Figure 6:
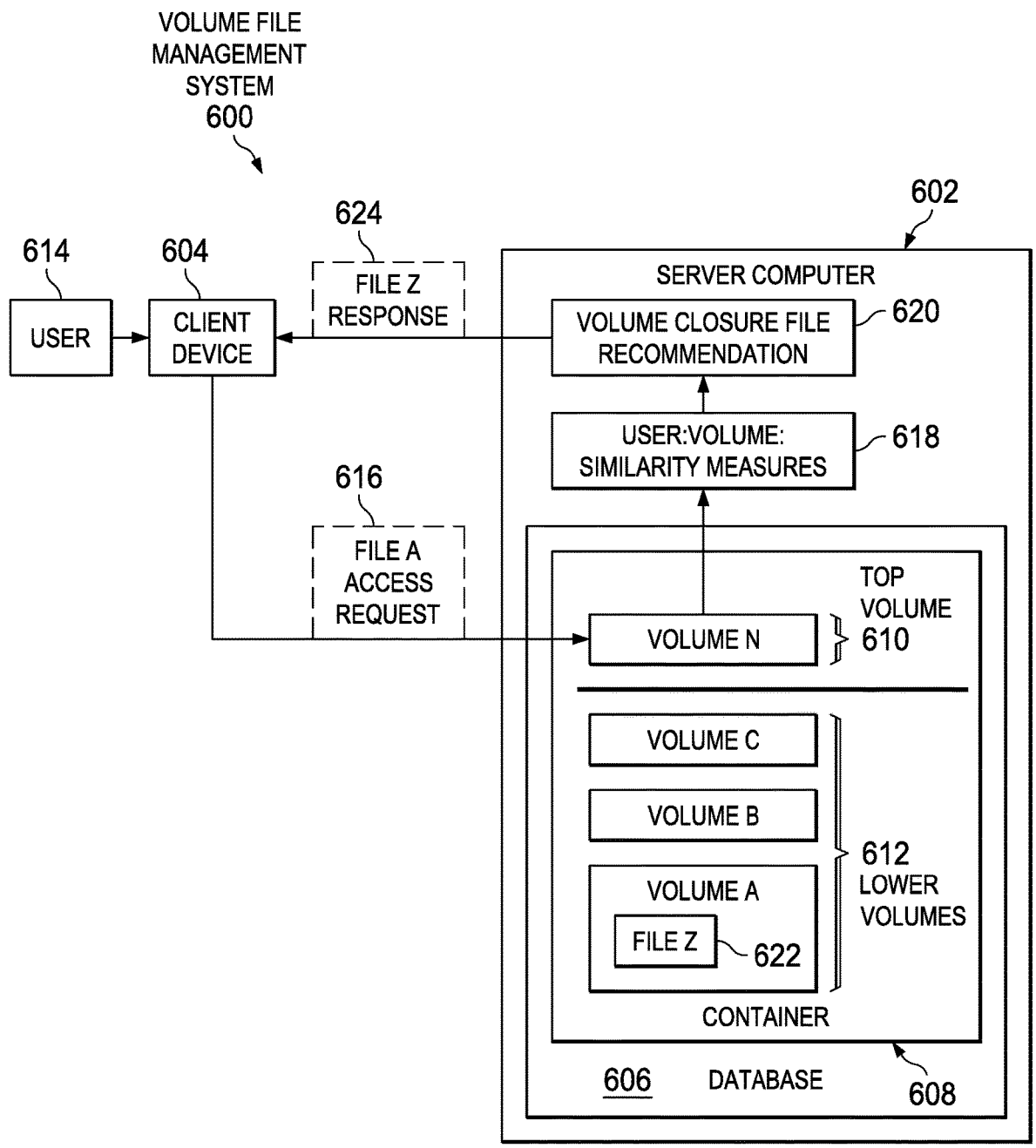
FIG. 6 is a diagram illustrating an example of a volume file management system in accordance with an illustrative embodiment.

With reference now to FIG. 6, a diagram illustrating an example of a volume file management system is depicted in accordance with an illustrative embodiment. Volume file management system 600 may be implemented in a network of data processing systems, such as network data processing system 100 in FIG. 1, or a cloud computing environment, such as cloud computing environment 300 in FIG. 3. Volume file management system 600 is a system of hardware and software components for managing access to a file within an inaccessible or closed lower layer data volume on a multi-layered data volume container based on user context and file similarity measures corresponding to a request to access the file.

In this example, volume file management system 600 includes server computer 602 and client device 604. Server computer 602 may be, for example, server 104 in FIG. 1, data processing system 200 in FIG. 2, a cloud computing node in cloud computing nodes 310 in FIG. 3, or server computer 502 in FIG. 5. Client device 604 may be, for example, client 110 in FIG. 1 or a local computing device, such as local computing device 320A in FIG. 3. However, it should be noted that volume file management system 600 is only intended as an example and may include any number of server computers and client devices.

In this example, server computer 602 contains database 606, such as database 236 in FIG. 2 or database 504 in FIG. 5. Database 606 includes container 608, which is comprised of top volume 610 and lower volumes 612. In other words, container 608 represents a multilayered data volume container. Top volume 610 represents a user accessible volume of data files. Lower volumes 612 represent a plurality of user inaccessible layered volumes of data files located below top volume 610.

User 614 utilizes client device 604 to send File A access request 616 to server computer 602 via a network, such as network 102 in FIG. 1. File A access request 616 represents a request by user 614 to access the data content of File A. In this example, server computer 602 was not able to locate a matching File A in user accessible top volume 610. As a result, server computer 602 generates similarity measures 618, which correspond to File A access request 616. Similarity measures 618 may be, for example, similarity measures 254 in FIG. 2. In addition, server computer 602 may determine a user context corresponding to File A access request 616. Server computer 602 may determine the user context by analyzing File A access request 616 using natural language processing. The user context may include, for example, user intent regarding File A, user sentiment and/or tone expressed in File A access request 616, and a time when server computer 602 received File A access request 616 from client device 604.

Based on generated similarity measures 618 and/or determined user context, server computer 602 generates volume closure file recommendation 620. Volume closure file recommendation 620 represents a recommendation of a file in lower volumes 612 that is substantially similar to File A. Substantially similar means same or almost equal. In this example, server computer 602 determined that File Z 622 in lowest-layered volume A was substantially similar to File A access request 616. Consequently, server computer 602 sends File Z response 624 to client device 604.

Figure 7:
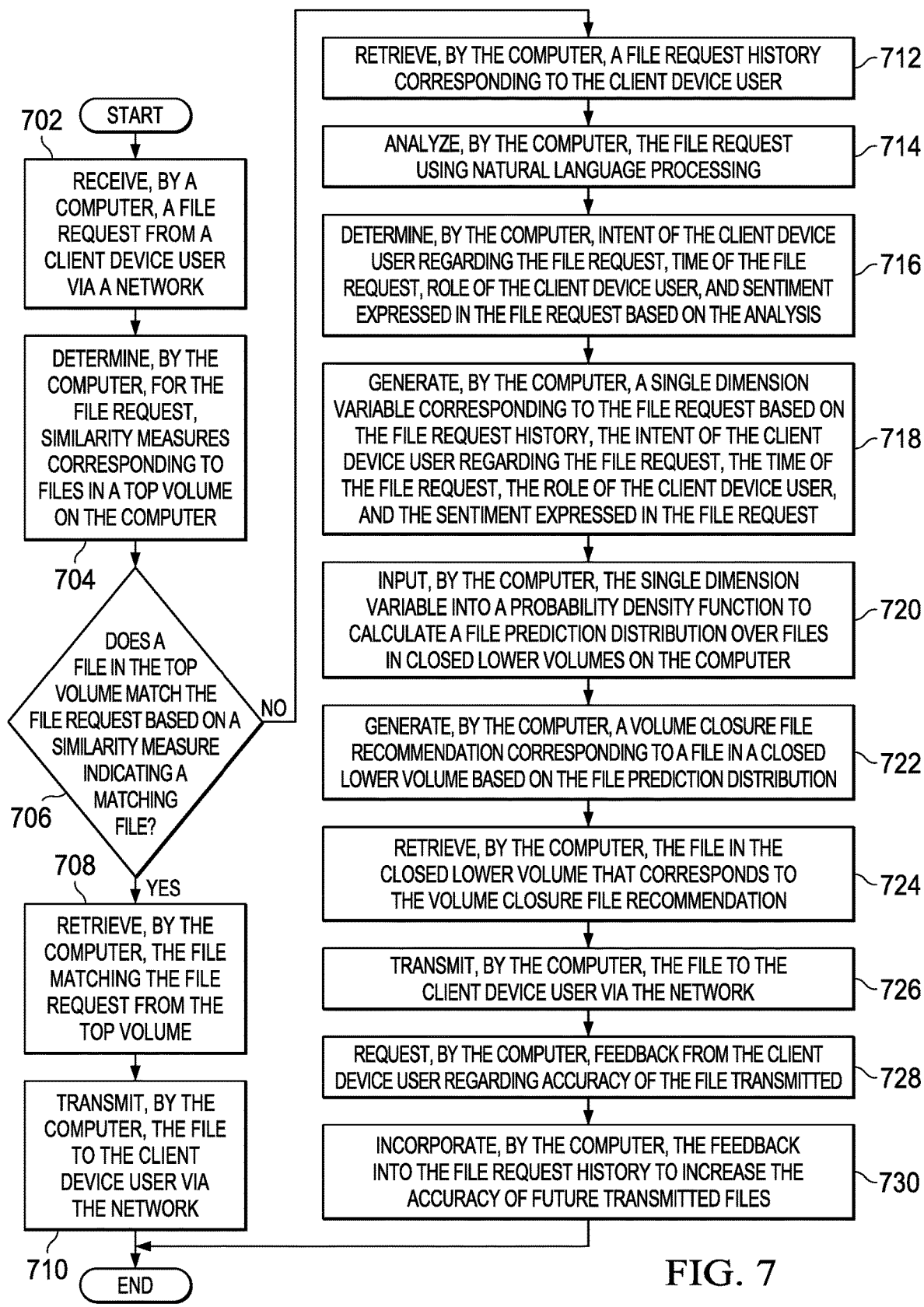
FIG. 7 is a flowchart illustrating a process for generating a volume closure file recommendation in accordance with an illustrative embodiment.

With reference now to FIG. 7, a flowchart illustrating a process for generating a volume closure file recommendation is shown in accordance with an illustrative embodiment. The process shown in FIG. 7 may be implemented in a computer, such as, for example, server 104 in FIG. 1, data processing system 200 in FIG. 2, a cloud computing node in cloud computing nodes 310 in FIG. 3, server computer 502 in FIG. 5, or server computer 602 in FIG. 6.

The process begins when the computer receives a file request from a client device user via a network (step 702). The file request may be, for example, file request 220 in FIG. 2 or file A access request 616 in FIG. 6. The client device may be, for example, client 110 in FIG. 1 or client device 604 in FIG. 6. The network may be, for example, network 102 in FIG. 1.

Subsequent to receiving the file request in step 702, the computer determines, for the file request, similarity measures corresponding to files in a top volume on the computer (step 704). The similarity measures may be, for example, similarity measures 254 in FIG. 2. The top volume may be, for example, top volume 610 in FIG. 6.

Afterward, the computer makes a determination as to whether a file in the top volume matches the file request based on a similarity measure indicating a matching file (step 706). If the computer determines that a file in the top volume matches the file request based on the similarity measure indicating a matching file, yes output of step 706, then the computer retrieves the file matching the file request from the top volume (step 708). In addition, the computer transmits the file to the client device user via the network (step 710). Thereafter the process terminates.

Returning again to step 706, if the computer determines that no file in the top volume matches the file request based on the determined similarity measures corresponding to the files in the top volume, no output of step 706, then the computer retrieves a file request history corresponding to the client device user (step 712). The file request history may be, for example, file request history 260 contained within user profile 258 in FIG. 2. Further, the computer analyzes the file request using natural language processing (step 714).

Subsequently, the computer determines intent of the client device user regarding the file request, time of the file request, role of the client device user, and sentiment expressed in the file request based on the analysis (step 716). The intent of the client device user regarding the file request, the time of the file request, the role of the client device user, and the sentiment expressed in the file request may be, for example, user intent 228, request time 230, user role 232, and user sentiment 234 in FIG. 2. Afterward, the computer generates a single dimension variable corresponding to the file request based on the file request history, the intent of the client device user regarding the file request, the time of the file request, the role of the client device user, and the sentiment expressed in the file request (step 718).

The computer inputs the single dimension variable into a probability density function, such as, for example, a Cauchy Distribution, to calculate a file prediction distribution over files in closed lower volumes on the computer (step 720). In addition, the computer generates a volume closure file recommendation corresponding to a file in a closed lower volume based on the file prediction distribution (step 722). The computer retrieves the file in the closed lower volume that corresponds to the volume closure file recommendation (step 724). Then, the computer transmits the file to the client device user via the network (step 726).

After transmitting the file to the client device user in step 726, the computer requests feedback from the client device user regarding accuracy of the file transmitted (step 728). After receiving the feedback, the computer incorporates the feedback into the file request history to increase the accuracy of future transmitted files to the client device user (step 730). Thereafter the process terminates.

Figure 8A:
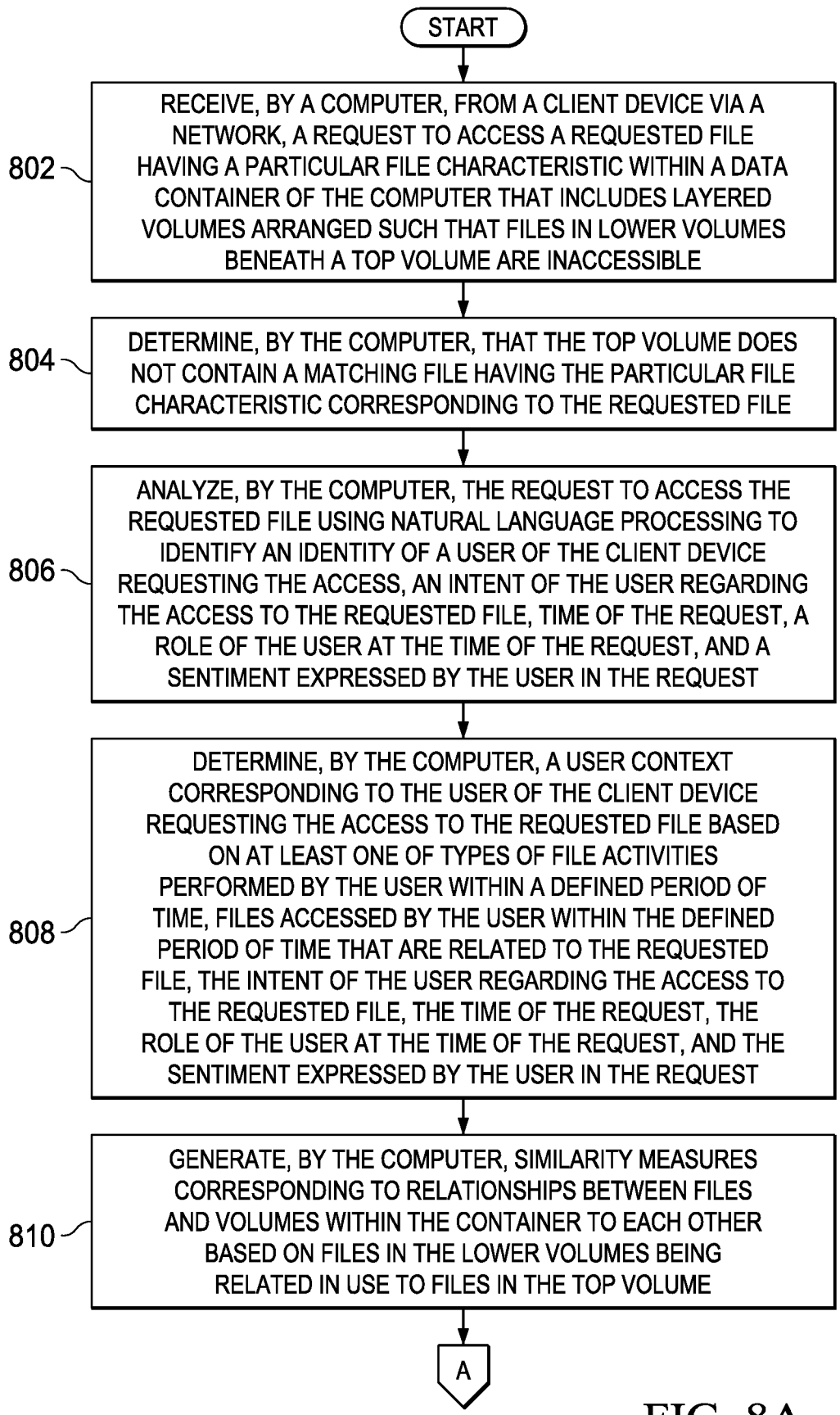
FIGS. 8A-8B are a flowchart illustrating a process for accessing files within inaccessible lower-layered volumes of a multilayered volume container in accordance with an illustrative embodiment.
Figure 8B:
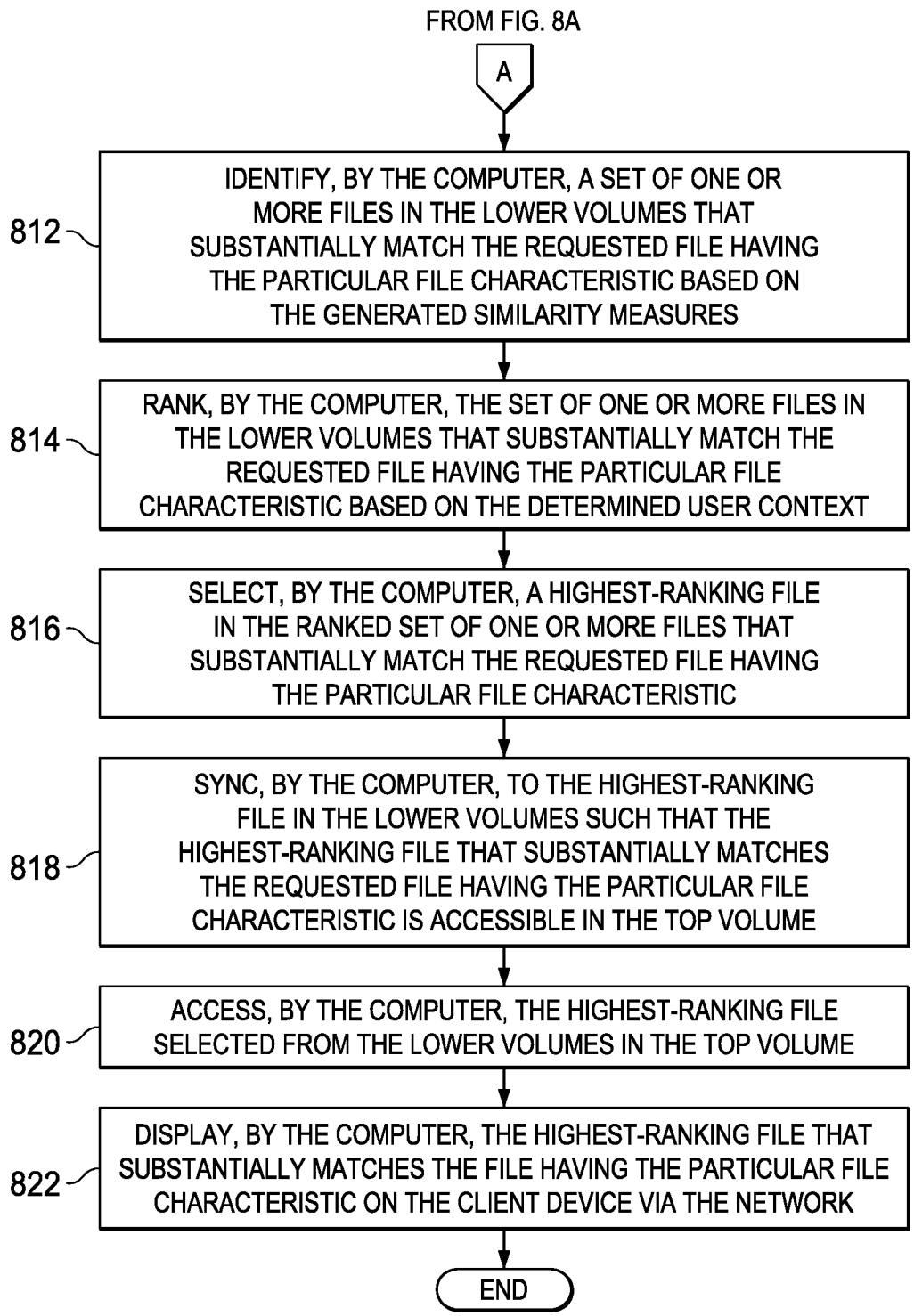

With reference now to FIGS. 8A-8B, a flowchart illustrating a process for accessing files within inaccessible lower-layered volumes of a multilayered volume container is shown in accordance with an illustrative embodiment. The process shown in FIGS. 8A-8B may be implemented in a computer, such as, for example, server 104 in FIG. 1, data processing system 200 in FIG. 2, a cloud computing node in cloud computing nodes 310 in FIG. 3, server computer 502 in FIG. 5, or server computer 602 in FIG. 6.

The process begins when the computer receives, from a client device via a network, a request to access a requested file having a particular file characteristic within a data container of the computer that includes layered volumes arranged such that files in lower volumes beneath a top volume are inaccessible to a user of the client device (step 802). The client device may be, for example, client 110 in FIG. 1 or client device 604 in FIG. 6. The user of the client device may be, for example, user 614 in FIG. 6. The network may be, for example, network 102 in FIG. 1. The container of the computer that includes layered volumes may be, for example, data container 246 that includes layered volumes 248 in FIG. 2 or container 608 that includes top volume 610 and lower volumes 612 in FIG. 6.

Subsequently, the computer determines that the top volume does not contain a matching file having the particular file characteristic corresponding to the requested file (step 804). In addition, the computer analyzes the request to access the requested file using natural language processing to identify an identity of a user of the client device requesting the access, an intent of the user regarding the access to the requested file, time of the request, a role of the user at the time of the request, and a sentiment expressed by the user in the request (step 806). The identity of the user of the client device requesting the access, the intent of the user regarding the access to the requested file, the time of the request, the role of the user at the time of the request, and the sentiment expressed by the user in the request may be, for example, user identity 226, user intent 228, request time 230, user role 232, and user sentiment 234 in FIG. 2.

Further, the computer determines a user context corresponding to the user of the client device requesting the access to the requested file based on at least one of types of file activities performed by the user within a defined period of time, files accessed by the user within the defined period of time that are related to the requested file, the intent of the user regarding the access to the requested file, the time of the request, the role of the user at the time of the request, and the sentiment expressed by the user in the request (step 808). The user context may be, for example, user context 224 in FIG. 2. The types of file activities performed by the user and the files accessed by the user within the defined period of time may be included in, for example, a file request history contained in a profile corresponding to the user, such as file request history 260 contained in user profile 258 of FIG. 2.

Furthermore, the computer generates similarity measures corresponding to relationships between files and volumes within the container to each other based on files in the lower volumes being related in use to files in the top volume (step 810). The similarity measures corresponding to relationships between files and volumes within the container may be, for example, similarity measures 254 in FIG. 2 or similarity measures 618 in FIG. 6. Moreover, the computer identifies a set of one or more files in the lower volumes that substantially match the requested file having the particular file characteristic based on the generated similarity measures (step 812).

The computer also ranks the set of one or more files in the lower volumes that substantially match the requested file having the particular file characteristic based on the determined user context (step 814). The set of ranked files in the lower volumes that substantially match the requested file having the particular file characteristic may be, for example, ranked list of substantially similar files 256 in FIG. 2. Afterward, the computer selects a highest-ranking file in the ranked set of one or more files that substantially match the requested file having the particular file characteristic (step 816).

The computer syncs to the highest-ranking file in the lower volumes such that the highest-ranking file that substantially matches the requested file having the particular file characteristic is accessible in the top volume (step 818). The top volume may be, for example, top volume 610 in FIG. 6. The computer accesses the highest-ranking file selected from the lower volumes in the top volume (step 820). In addition, the computer displays the highest-ranking file that substantially matches the file having the particular file characteristic on the client device via the network (step 822). Thereafter, the process terminates.

Thus, illustrative embodiments of the present invention provide a computer-implemented method, computer system, and computer program product for managing access to files within user inaccessible lower layer data volumes on a multilayered data volume container based on determined user context and generated file similarity measures corresponding to requests to access the files in the container. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for accessing files within user inaccessible lower layer data volumes on a multilayered data volume container, the computer-implemented method comprising: generating, by a computer, a single dimension variable corresponding to a file request; calculating, by the computer, a file prediction distribution over files in closed lower volumes on the multilayered data volume container by inputting the single dimension variable into a probability density function; generating, by the computer, a volume closure file recommendation corresponding to a file in a closed lower volume based on the file prediction distribution; and retrieving, by the computer, the file in the closed lower volume that corresponds to the volume closure file recommendation.

2. The computer-implemented method of claim 1 further comprising: receiving, by the computer, the file request from a client device corresponding to a user via a network; determining, by the computer, for the file request, similarity measures corresponding to files in an accessible top volume on the multilayered data volume container; and determining, by the computer, whether a file in the accessible top volume matches the file request based on a determined similarity measure indicating a matching file.

3. The computer-implemented method of claim 2 further comprising: responsive to the computer determining that a file in the accessible top volume matches the file request based on the determined similarity measure indicating a matching file, retrieving, by the computer, the file matching the file request from the accessible top volume; and transmitting, by the computer, the file retrieved from the accessible top volume to the client device via the network.

4. The computer-implemented method of claim 2 further comprising: responsive to the computer determining that no file in the accessible top volume matches the file request based on determined similarity measures corresponding to the files in the accessible top volume, retrieving, by the computer, a file request history of the user; analyzing, by the computer, the file request using natural language processing; determining, by the computer, intent of the user regarding the file request, time of the file request, role of the user at the time of the file request, and sentiment expressed by the user in the file request based on the analyzing of the file request using the natural language processing; and generating, by the computer, the single dimension variable corresponding to the file request based on the file request history of the user, the intent of the user regarding the file request, the time of the file request, the role of the user at the time of the file request, and the sentiment expressed by the user in the file request.

5. The computer-implemented method of claim 3 further comprising: requesting, by the computer, feedback from the user regarding accuracy of the file transmitted to the client device; and incorporating, by the computer, the feedback into a file request history of the user to increase accuracy of future transmitted files to the client device.

6. A computer system for accessing files within user inaccessible lower layer data volumes on a multilayered data volume container, the computer system comprising: a bus system; a storage device connected to the bus system, wherein the storage device stores program instructions; and a processor connected to the bus system, wherein the processor executes the program instructions to: generate a single dimension variable corresponding to a file request; calculate a file prediction distribution over files in closed lower volumes on the multilayered data volume container by inputting the single dimension variable into a probability density function; generate a volume closure file recommendation corresponding to a file in a closed lower volume based on the file prediction distribution; and retrieve the file in the closed lower volume that corresponds to the volume closure file recommendation.

7. The computer system of claim 6, wherein the processor further executes the program instructions to: receive the file request from a client device corresponding to a user via a network; determine, for the file request, similarity measures corresponding to files in an accessible top volume on the multilayered data volume container; and determine whether a file in the accessible top volume matches the file request based on a determined similarity measure indicating a matching file.

8. The computer system of claim 7, wherein the processor further executes the program instructions to: retrieve the file matching the file request from the accessible top volume in response to determining that a file in the accessible top volume matches the file request based on the determined similarity measure indicating a matching file; and transmit the file retrieved from the accessible top volume to the client device via the network.

9. The computer system of claim 7, wherein the processor further executes the program instructions to: retrieve a file request history of the user in response to determining that no file in the accessible top volume matches the file request based on determined similarity measures corresponding to the files in the accessible top volume; analyze the file request using natural language processing; determine intent of the user regarding the file request, time of the file request, role of the user at the time of the file request, and sentiment expressed by the user in the file request based on analyzing the file request using the natural language processing; and generate the single dimension variable corresponding to the file request based on the file request history of the user, the intent of the user regarding the file request, the time of the file request, the role of the user at the time of the file request, and the sentiment expressed by the user in the file request.

10. The computer system of claim 8, wherein the processor further executes the program instructions to: request feedback from the user regarding accuracy of the file transmitted to the client device; and incorporate the feedback into a file request history of the user to increase accuracy of future transmitted files to the client device.

11. A computer program product for accessing files within user inaccessible lower layer data volumes on a multilayered data volume container, the computer program product comprising a computer readable storage medium having program instructions embodied therewith, the program instructions executable by a computer to cause the computer to perform a method comprising: generating, by the computer, a single dimension variable corresponding to a file request; calculating, by the computer, a file prediction distribution over files in closed lower volumes on the multilayered data volume container by inputting the single dimension variable into a probability density function; generating, by the computer, a volume closure file recommendation corresponding to a file in a closed lower volume based on the file prediction distribution; and retrieving, by the computer, the file in the closed lower volume that corresponds to the volume closure file recommendation.

12. The computer program product of claim 11 further comprising: receiving, by the computer, the file request from a client device corresponding to a user via a network; determining, by the computer, for the file request, similarity measures corresponding to files in an accessible top volume on the multilayered data volume container; and determining, by the computer, whether a file in the accessible top volume matches the file request based on a determined similarity measure indicating a matching file.

13. The computer program product of claim 12 further comprising: responsive to the computer determining that a file in the accessible top volume matches the file request based on the determined similarity measure indicating a matching file, retrieving, by the computer, the file matching the file request from the accessible top volume; and transmitting, by the computer, the file retrieved from the accessible top volume to the client device via the network.

14. The computer program product of claim 12 further comprising: responsive to the computer determining that no file in the accessible top volume matches the file request based on determined similarity measures corresponding to the files in the accessible top volume, retrieving, by the computer, a file request history of the user; analyzing, by the computer, the file request using natural language processing; determining, by the computer, intent of the user regarding the file request, time of the file request, role of the user at the time of the file request, and sentiment expressed by the user in the file request based on the analyzing of the file request using the natural language processing; and generating, by the computer, the single dimension variable corresponding to the file request based on the file request history of the user, the intent of the user regarding the file request, the time of the file request, the role of the user at the time of the file request, and the sentiment expressed by the user in the file request.

15. The computer program product of claim 13 further comprising: requesting, by the computer, feedback from the user regarding accuracy of the file transmitted to the client device; and incorporating, by the computer, the feedback into a file request history of the user to increase accuracy of future transmitted files to the client device.

16. A computer-implemented method for managing access to files within a multilayered data volume container, the computer-implemented method comprising: receiving, by a computer, from a client device via a network, a request to access a requested file having a particular file characteristic within a data container of the computer that includes layered volumes arranged such that files in lower volumes beneath a top volume are inaccessible to a user of the client device; determining, by the computer, that the top volume does not contain a matching file having the particular file characteristic corresponding to the requested file; identifying, by the computer, a file in the lower volumes that matches the requested file having the particular file characteristic based on a generated similarity measure; and syncing, by the computer, to the file in the lower volumes such that the file is accessible in the top volume.

17. The computer-implemented method of claim 16 further comprising: analyzing, by the computer, the request to access the requested file using natural language processing to identify an identity of the user of the client device requesting the access, an intent of the user regarding the access to the requested file, time of the request, a role of the user at the time of the request, and a sentiment expressed by the user in the request; and determining, by the computer, a user context corresponding to the user of the client device requesting the access to the requested file based on at least one of types of file activities performed by the user within a defined period of time, files accessed by the user within the defined period of time that are related to the requested file, the intent of the user regarding the access to the requested file, the time of the request, the role of the user at the time of the request, and the sentiment expressed by the user in the request.

18. The computer-implemented method of claim 17 further comprising: ranking, by the computer, a set of files in the lower volumes that match the requested file having the particular file characteristic based on the user context; and selecting, by the computer, a highest-ranking file in the ranked set of files that match the requested file having the particular file characteristic.

19. The computer-implemented method of claim 18 further comprising: accessing, by the computer, the highest-ranking file selected from the lower volumes in the top volume; and displaying, by the computer, the highest-ranking file that matches the file having the particular file characteristic on the client device via the network.

20. The computer-implemented method of claim 16 further comprising: generating, by the computer, similarity measures corresponding to relationships between files and volumes within the multilayered data volume container to each other based on files in the lower volumes being related in use to files in the top volume.

21. A computer program product for managing access to files within a multilayered data volume container, the computer program product comprising a computer readable storage medium having program instructions embodied therewith, the program instructions executable by a computer to cause the computer to perform a method comprising: receiving, by a computer, from a client device via a network, a request to access a requested file having a particular file characteristic within a data container of the computer that includes layered volumes arranged such that files in lower volumes beneath a top volume are inaccessible to a user of the client device; determining, by the computer, that the top volume does not contain a matching file having the particular file characteristic corresponding to the requested file; identifying, by the computer, a file in the lower volumes that matches the requested file having the particular file characteristic based on a generated similarity measure; and syncing, by the computer, to the file in the lower volumes such that the file is accessible in the top volume.

22. The computer program product of claim 21 further comprising: analyzing, by the computer, the request to access the requested file using natural language processing to identify an identity of the user of the client device requesting the access, an intent of the user regarding the access to the requested file, time of the request, a role of the user at the time of the request, and a sentiment expressed by the user in the request; and determining, by the computer, a user context corresponding to the user of the client device requesting the access to the requested file based on at least one of types of file activities performed by the user within a defined period of time, files accessed by the user within the defined period of time that are related to the requested file, the intent of the user regarding the access to the requested file, the time of the request, the role of the user at the time of the request, and the sentiment expressed by the user in the request.

23. The computer program product of claim 22 further comprising: ranking, by the computer, a set of files in the lower volumes that match the requested file having the particular file characteristic based on the user context; and selecting, by the computer, a highest-ranking file in the ranked set of files that match the requested file having the particular file characteristic.

24. The computer program product of claim 23 further comprising: accessing, by the computer, the highest-ranking file selected from the lower volumes in the top volume; and displaying, by the computer, the highest-ranking file that matches the file having the particular file characteristic on the client device via the network.

25. The computer program product of claim 21 further comprising: generating, by the computer, similarity measures corresponding to relationships between files and volumes within the multilayered data volume container to each other based on files in the lower volumes being related in use to files in the top volume.

* * * * *